Sept. 6, 1938. G. J. BEHLING ET AL 2,129,191
SAFETYPIN
Original Filed Feb. 10, 1937
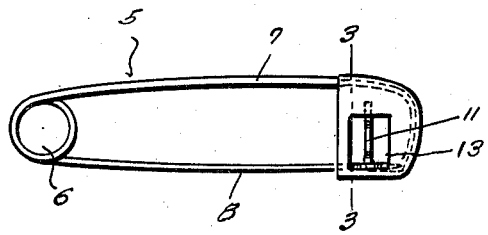
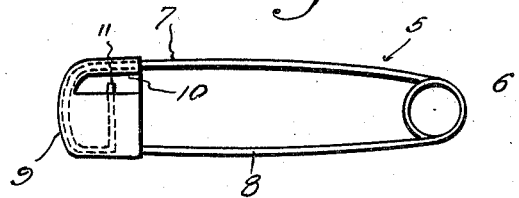
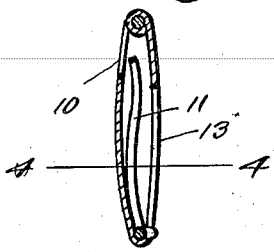
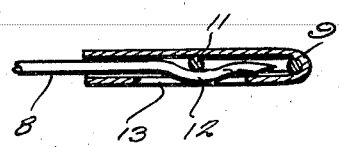
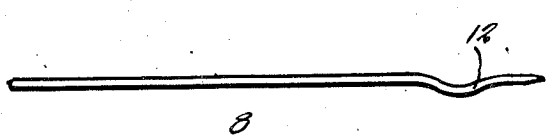
Inventor
George J. Behling
Nicholas Dykstra
By Clarence A. O'Brien
Hyman Berman
Attorneys Patented Sept. 6, 1938

2,129,191

UNITED STATES PATENT OFFICE 2,129,191

SAFETYPIN

George J. Behling, Croton on Hudson, and Nicholas Dykstra, Ossining, N. Y.

Application February 10, 1937, Serial No. 125,136
Renewed July 28, 1938

1 Claim. (Cl. 24—156)

This invention relates to safety pins and an object of the invention is to provide an improved safety pin so constructed as to insure a positive retention of the pointed end of the pin within the usual guard provided therefor as a part of the pin; and the invention together with its objects and advantages may be best understood from a study of the following description taken in connection with the accompanying drawing wherein:—

Figure 1 is a view of the pin from one side thereof.

Figure 2 is a view of the pin from the opposite side thereof.

Figure 3 is a sectional view taken substantially on the line 3—3 of Figure 1.

Figure 4 is a sectional view taken substantially on the line 4—4 of Figure 3.

Figure 5 is a side elevational view of the pointed end of the safety pin.

Referring to the drawing by reference numerals it will be seen that 5 indicates generally a safety pin which as is conventional is formed from a single length of wire suitably twisted intermediate its ends to provide a spring 6 and a pair of prongs or side members 7 and 8.

Suitably associated with the prong or side member 7 is the socket or guard 9 that is provided at one side with the opening 10 for the reception of the pointed end of the prong or side member 8 of the safety pin.

However, in accordance with the present invention there is struck out from one side of the guard or socket 9 the longitudinally curved retaining prong or finger 11. Also adjacent the pointed end thereof the member 8 of the safety pin is arcuate as at 12. It will thus be seen that when the pointed end of the prong 8 of the pin is placed within the socket 9 through the opening 10 the arcuate portion 12 of the pin is positioned between the finger 11 and the side of the socket 9 opposite to that side thereof equipped with the opening 10 and as the space between the free end of the finger 11 and the opposite portion of the wall of the socket 9 is such as to prevent free passage of the part 12 of the member 8, pressure must be applied to the member 8 to force the part 12 past the upper end of the finger 11 until the part 12 enters the opening 13. The finger 11 will act on the arcuate portion 12 of the part 8 of the pin to force said arcuate portion through the slot 13 with the result that not only will the finger 11 cooperating with the arcuate portion 12 of the prong 8 serve to retain the pointed end of the prong 8 within the socket 9 but the arcuate portion 12 of the member 8 engaging in the slot 13 in a manner clearly shown in Figure 4 will serve to retain the pointed end of the member 8 within the socket against pulling out of the socket in the direction of length of the member 8. Also pressure must be applied to the member 8 in removing the end thereof from the socket, in order to press the part 12 through the space between the free end of the finger 11 and that portion of the socket 9 immediately above the slot 13.

It will thus be seen that I have provided a safety pin wherein adequate provision is made for securing the pointed end of the prong of the pin within its socket positively against casual displacement.

Having thus described the invention, what is claimed as new is:—

In a safety pin the combination of a guard member having a lateral opening at one side, the prong having a pointed end adapted to be engaged in said guard member and being insertable into the guard through said lateral opening, and said guard in the side thereof opposite to said opening being provided with a slot, a finger in the guard cooperable with the pointed end of the safety pin for releasably securing the said end within said guard, and said pointed end of the safety pin having an arcuate portion in the concavity of which said finger is adapted to engage for forcing said arcuate portion of the pointed end of the safety pin into said slot for positively securing the pointed end of the safety pin within said guard.

GEORGE J. BEHLING.
NICHOLAS DYKSTRA.